(12) United States Patent
Parareda Oriol et al.

(10) Patent No.: US 12,553,808 B2
(45) Date of Patent: Feb. 17, 2026

(54) FATIGUE LIMIT TESTING METHOD FOR SPECIMENS

(71) Applicant: Fundació Eurecat, Cerdanyola del Vallés (ES)

(72) Inventors: Sergi Parareda Oriol, Vic (ES); Antoni Lara Pérez, Castelltallat (ES); Daniel Casellas Padró, Manresa (ES)

(73) Assignee: Fundació Eurecat, Cerdanyola del Vallés (ES)

( * ) Notice: Subject to any disclaimer, the term of this patent is extended or adjusted under 35 U.S.C. 154(b) by 307 days.

(21) Appl. No.: 18/040,984

(22) PCT Filed: Jul. 27, 2021

(86) PCT No.: PCT/EP2021/070975
§ 371 (c)(1),
(2) Date: Feb. 8, 2023

(87) PCT Pub. No.: WO2022/033865
PCT Pub. Date: Feb. 17, 2022

(65) Prior Publication Data
US 2023/0266217 A1    Aug. 24, 2023

(30) Foreign Application Priority Data
Aug. 10, 2020  (EP) .................................. 20382742

(51) Int. Cl.
*G01N 3/32*  (2006.01)
*G01N 3/08*  (2006.01)

(52) U.S. Cl.
CPC ................ *G01N 3/32* (2013.01); *G01N 3/08* (2013.01); *G01N 2203/0007* (2013.01); *G01N 2203/0017* (2013.01)

(58) Field of Classification Search
CPC ........ G01N 27/725; G01N 27/42; G01N 3/20; G01N 3/18; G01N 29/227; G01N 3/38;
(Continued)

(56) References Cited

U.S. PATENT DOCUMENTS

| 2,316,253 A | 4/1943 | George |
| 4,379,410 A | 4/1983 | Fritts et al. |

(Continued)

FOREIGN PATENT DOCUMENTS

| CN | 105372136 | 4/2018 |
| EP | 0577512 A1 | 1/1994 |

(Continued)

OTHER PUBLICATIONS

European Patent Office; International Search Report and Written Opinion for PCT/EP2021/070975; Oct. 13, 2021; entire document.

*Primary Examiner* — Brandi N Hopkins
(74) *Attorney, Agent, or Firm* — ALLEN, DYER, DOPPELT & GILCHRIST, P.A.

(57) ABSTRACT

Fatigue limit testing method for specimens comprising subjecting a specimen (10) to be tested to successive test blocks (1, 2, 3, 4, 5, 6, 7), each test block (1, 2, 3, 4, 5, 6, 7) comprising applying to the specimen successive cyclic loads according to load parameters with an amplitude bigger than the load parameters of cyclic loads of the preceding test block; subjecting said specimen to successive deformation tests (a, b, c, d, e, f), each deformation test being performed between two successive test blocks and comprising the application of a isolated specific load to the specimen and performing deformation measurements from said element while being subjected to said specific load; and characterizing a fatigue behavior of the specimen considering at least a variation occurring on the successive deformation mea- (Continued)

surements and considering the load parameters of cyclic loads preceding each deformation measurement.

15 Claims, 3 Drawing Sheets

(58) Field of Classification Search
CPC .......... G01N 17/00; G01N 3/48; G01N 3/32; G01N 3/34; G01N 3/36; G01N 3/60; G01N 3/00; G01N 3/08; G01N 29/043; G01N 3/56; G01M 1/22; G01M 5/0025; C22C 21/00
USPC .......................................................... 73/81
See application file for complete search history.

(56) References Cited

U.S. PATENT DOCUMENTS

| | | | |
|---|---|---|---|
| 5,959,215 | A | 9/1999 | Ono et al. |
| 2012/0240688 | A1* | 9/2012 | Myers ...................... G01N 3/08 |
| | | | 73/826 |
| 2014/0067285 | A1 | 3/2014 | Khonsari et al. |
| 2018/0372604 | A1 | 12/2018 | Martinez De Castaneda et al. |

FOREIGN PATENT DOCUMENTS

| | | |
|---|---|---|
| EP | 3418560 A1 | 12/2018 |
| RU | 2686877 C1 | 5/2019 |
| WO | WO2004015398 A1 | 2/2004 |
| WO | WO2017168214 A1 | 10/2017 |

* cited by examiner

FATIGUE LIMIT TESTING METHOD FOR SPECIMENS

TECHNICAL FIELD

The present invention is directed to an accelerated fatigue limit testing method for specimens, for example standard test samples made of a material to be tested, or pieces or parts of a product to be tested. Said specimens will preferable be made of metal.

This method allows an accelerated and economical fatigue test using regular testing equipment.

The proposed fatigue limit testing method comprises successive test blocks, where cyclic loads are applied to a specimen, with successive deformation tests performed between said successive test blocks to monitor the fatigue damage of the specimen during the test. The cyclic loads of each test block have an amplitude higher than the amplitude of the cyclic loads of the preceding test blocks.

The results allow the characterization of the fatigue behavior of the studied specimen.

STATE OF THE ART

The fatigue test method to determine the fatigue limit, where breakage of the material will not occur, is known to require several specimens (at least 9) tested at high number of cycles, usually millions. This test method is very slow and expensive either by the manufacturing of multiple specimens and the elevated testing time.

It is also known, for example through document U.S. Pat. No. 4,379,410A, to measure the deformation suffered by a specimen during the cyclical load, allowing to obtain measurements of the variation that this deformation suffers throughout the test, allowing to better characterize the sample. However, this improvement does not substantially reduce the total duration of the test. Furthermore, accurately measuring the deformation of the sample during the application of a cyclic load requires high precision equipment, requiring high maintenance and expert handling, which further increases costs.

Document EP0577512A1 also describes a variation of said method, according to which the specimen is subjected to successive test blocks of cyclic loads of an increasing amplitude, measuring the heating of the specimen, using thermography, during the maximum load of each cyclic load. Said heating is indicative of the fatigue damage suffered by the specimen, and the characterization of the fatigue behavior of the specimen can be calculated in an accelerated manner using the heating measurements.

But the precise heating measurement of the specimen while the cyclic loads are applied requires a very sensitive equipment and the isolation of the sample from any external heat source during the test. Also, a variation in the ambient conditions during the fatigue test, a non-uniform cooling of the specimen between test blocks, or the application of different rest times between successive test blocks can affect the results of the fatigue test. Therefore, this method is very expensive, requiring a highly specialized equipment and personal, and prone to produce inconsistent results due to the influence of external factors, such the ambient temperature or incident sunlight, on those results.

Document EP3418560A1 describes a fatigue testing method according to which a multi-axial vibration with reciprocating cyclic loads is applied to a specimen. The multiple actuators of the test bench allow increasing the testing frequency that accelerates the breakage of the specimen and reduces the duration of the fatigue test compared to full-scale testing of a wind turbine. This document also describes the use of a more traditional isolated load test to determine the breakage load of the specimen.

Document WO2017168214A1 describes a fatigue limit testing method in which a vibration with reciprocating cyclic loads is applied to a specimen. The deformation of the specimen is continuously measured throughout the test to determine the fatigue limit based on a stated criterion for asphalt specimen failure. Continuous and accurate measurement of deformation during the application of cyclic loads is extremely difficult and requires very sensitive equipment, skilled and trained operators and therefore are expensive and prone to incorrect data collection.

Documents CN105372136A, RU2686877C1 and WO2004015398A1 also describe a similar solution continuously measuring the deformation while the application of the cyclic loads, with the above described problems.

The present invention provides an accelerated fatigue testing method which solves the above described and other problems.

BRIEF DESCRIPTION OF THE INVENTION

The present invention is directed to a rapid fatigue testing method for specimens, preferably selected among pieces or parts of a product to be tested and standardized test samples.

The proposed method comprises:
subjecting a specimen to be tested to successive test blocks, each test block comprising applying a vibration to the specimen, the vibration being defined by reciprocating successive cyclic loads according to load parameters, the load parameters of the cyclic loads of each test block having an amplitude higher than the load parameters of cyclic loads of the preceding test block;
pause the cyclic loads between successive test blocks;
subjecting the specimen to successive deformation test, each deformation test being performed comprising the application of an isolated specific load to the specimen and performing deformation measurements from said specimen while being subjected to said specific load; and
characterizing a fatigue behavior of the specimen considering at least a variation occurring on the successive deformation measurements and considering the load parameters of cyclic loads preceding each deformation measurement.

It will be understood that reciprocating successive cyclic loads constitutive of a vibration are uninterrupted cyclic loads, typically forming a sinusoidal waves (amplitude/time), without rest time in between, and that isolated specific loads are loads not adjacent to other loads, starting from and finishing in an unloaded state of the specimen.

According to that, one specimen is introduced in testing equipment, clamped between two clamping points of said testing equipment. The testing equipment can produce a relative movement, preferably a uniaxial movement, between said two clamping points applying cycling loads to the specimen clamped in between.

Said cyclic loads follow a load pattern which determines a vibration including a certain number of cycles with a predefined frequency and amplitude.

Then the method comprises alternate test blocks and tests. During each test block the specimen is subjected to a sequence of cyclic loads following said predefined load parameters, producing a vibration which induce fatigue on the specimen.

The load parameters of the cyclic loads produced on each test block determine that said cyclic loads have a higher amplitude than the cyclic loads produced in the preceding test blocks, determining that the successive test blocks apply cycling loads with increasingly higher amplitude, inducing an increasing fatigue damage on the specimen on each test block. In other words, the cyclic loads contained on each test block have higher amplitude than the cyclic loads contained in the preceding test blocks.

The deformation tests are performed between successive test blocks to determine if a reduction in the stiffness (or increase in the compliance) of the specimen has occurred since the last deformation test.

During each deformation test, the specimen is subjected to an isolated specific load of a predefined intensity, and the deformation suffered by the specimen while subjected to said isolated specific load is measured providing a deformation measurement.

After each test block, an identic isolated specific load is applied on the specimen and a new deformation measurement is obtained.

When the specimen suffers damage due to the fatigue induced by the cyclic loads, its stiffness is reduced experiencing larger deformations when subjected to the isolated specific load in comparison with deformation measurements performed on the specimen when no fatigue damage or reduced fatigue damage has been produced on the specimen, during initial steps of the proposed test method.

Considering said variations on the results of the successive deformation measurements and considering the load parameters of the cyclic loads contained in the test block preceding each deformation measurement, the fatigue behavior of the specimen is characterized.

This method allows a rapid and precise characterization of any specimen requiring only a few hours of testing and requiring only regular testing machinery.

During the application of the cyclic loads, preferably no deformation of the specimen is measured.

Preferably said isolated specific load applied to the specimen during the deformation test is lower than the known yield strength limit of the unfatigued specimen and more preferably is comprised between 15% and 60% of said known yield strength, it is to say that the intensity of the isolated specific load is comprised between 15% and 60% of the maximal intensity of a load applicable on the unfatigued specimen without producing plastic deformation.

Said known yield strength can be obtained for example from a uniaxial tensile test performed on another specimen which has not suffered fatigue damage, and which has identical properties (shape, dimensions, material) than the specimen subjected to the cyclic loads during the test blocks.

A tensile test consists on the application of a controlled and increasing stress on the specimen until failure while measuring changes in its longitude determining the yield stress, the stress at which the unfatigued specimen starts the plastic deformation, and determining the breaking limit, the stress at which the unfatigued specimen fractures.

While the specimen does not suffer damage due to the fatigue induced by the cyclic loads performed on the successive test blocks, the results of the deformation measurements performed on each successive deformation test will be the same and will be an elastic deformation of the specimen.

Once the specimen suffers fatigue damage in some degree, the following deformation tests will produce successive deformation measurements of increasing magnitude, as a consequence of the stiffness reduction of the specimen due to the fatigue damage suffered.

Knowing the variation in the deformation measurements after each test block which induces fatigue damage in the specimen and knowing the load parameters of the cyclic loads applied during said test blocks, allows the characterization of the fatigue behavior of the specimen.

The load parameters of the cyclic loads comprised on each test block preferably comprise:
 cyclic loads having a frequency comprised between 1 Hz and 80 Hz; and/or
 between 4000 and 8000 cycles; and/or
 cyclic loads all with the same frequency and amplitude; and/or
 cyclic loads all with the same frequency, said frequency being equal to the frequency of the cyclic loads contained in the other test blocks; and/or
 the same number of cycles than the other test blocks.

It is also proposed that the increase in the amplitude of the load parameters of the cyclic loads between successive test blocks follows a predefined increase pattern, for example a linear pattern, a logarithmic pattern, or a combination of both patterns.

When the increase of the amplitude follows a linear pattern, said increase in the amplitude between two successive test blocks has always the same magnitude. When a big increase in the amplitude is applied between successive test blocks, few test blocks are required for the completion of the fatigue limit testing method, resulting in a faster and cheaper procedure, but offering low precision. When a low increase in the amplitude is applied between successive test blocks, more test blocks are required for the completion of the fatigue limit testing method, resulting in a slower and more expensive procedure, but offering higher precision in the characterization of the specimen. According to that, the speed, cost and precision of the proposed fatigue limit testing method can be easily adjusted.

When the increase of the amplitude follows a logarithmic pattern, said increase in the amplitude between two successive test blocks is decreasing in magnitude, reducing the difference between successive test blocks. This logarithmic pattern accelerates the initial steps of the fatigue limit testing method without reducing the precision on the obtained results.

According to an alternative, the increase in the amplitude of the load parameters of the cyclic loads can follow a hybrid pattern with an initial phase following a linear pattern, and a final phase following a logarithmic pattern.

Preferably the test blocks and the deformation tests are alternated until the fracture of the specimen occurs.

The deformation measurements can be obtained from an extensometer and/or from an optic sensor facing a surface of the specimen comprising a stochastic pattern.

The proposed method can further comprise calculate an undamaged fatigue limit of the specimen considering the results of successive deformation tests each set in relation to the amplitude of the previous test block.

More in detail, the results of successive deformation tests can be included in a bidimensional chart with an axis representing the measured deformation of the specimen on each deformation test and the other axis representing the maximum amplitude of the loads of the test block performed previous to each deformation test. The undamaged fatigue limit of the specimen can be obtained, on said bidimensional chart, from the intersection between an asymptote line defined by the results of the successive deformation tests and an axis corresponding to zero deformation of the specimen.

According to that, the undamaged fatigue limit of the specimen is determined by the intersection between the abscissa axis (amplitude of each test block) and a straight line taken as the asymptote line of the deformation variation curve.

According to one embodiment, the specimen on which the fatigue limit testing is applied is a flat rectangular specimen and elongated in a longitudinal axis direction and wherein the cyclic loads are applied thereon parallel to said longitudinal axis direction, so that the obtained fatigue behavior corresponds with the fatigue behavior of the from which it is made.

Alternatively, the specimen on which the fatigue limit testing is applied can be a non-rectangular and/or non-flat test piece wherein the cyclic loads are applied thereon from two separated subjection points of said test piece, so that the obtained fatigue behavior corresponds to the fatigue behavior of said particular piece, for example, an automotive component or a machine component.

Preferably each load of the cyclic loads produces tensile stress on the specimen and/or each isolated specific load produces tensile stress on the specimen.

It is also proposed to actively, or passively, cool the specimen to a room temperature between successive test blocks. This offers a more realistic results, preventing an overheating of the specimen which could affect its fatigue behavior, especially for polymeric and composite materials.

During the cyclic loads, the specimen can suffer an increase on its temperature. It is proposed to reduce said temperature, for example to a room temperature comprised between 15° C. and 30° C. Said reduction in the temperature can be obtained by active means such as a blower blowing air at a room temperature against the specimen, or by pausing between successive test blocks enough time to dissipate the heat of the specimen to the surrounding ambient air.

It will also be understood that any range of values given may not be optimal in extreme values and may require adaptations of the invention to these extreme values are applicable, such adaptations being within reach of a skilled person.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which.

DETAILED DESCRIPTION OF AN EMBODIMENT

Figure 4:
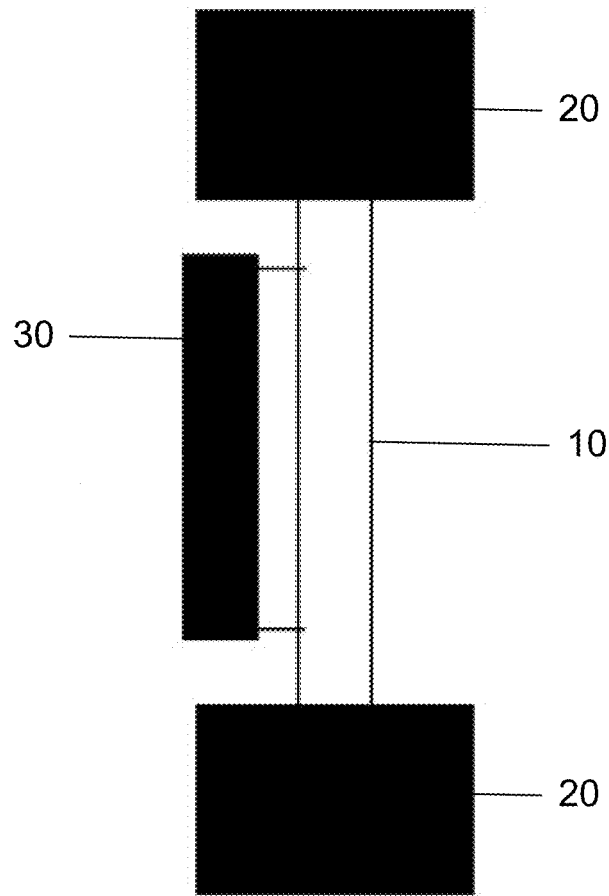
FIG. 4 shows a schematic view of a fatigue test machine.

The foregoing and other advantages and features will be more fully understood from the following detailed description of an embodiment with reference to the accompanying drawings, to be taken in an illustrative and not limitative, in which:

According to an example of the present invention, a metal specimen 10 is retained between two clamps 20, and an extensometer 30 is associated to said specimen 10 to measure its deformation, as shown on FIG. 4.

Then, specimen 10 is subjected to successive test blocks 1, 2, 3, 4, 5, 6 and 7 of cyclic loads, each including the same number of cyclic loads, all of the same frequency, produced by a relative movement between the clamps 20.

Figure 1:
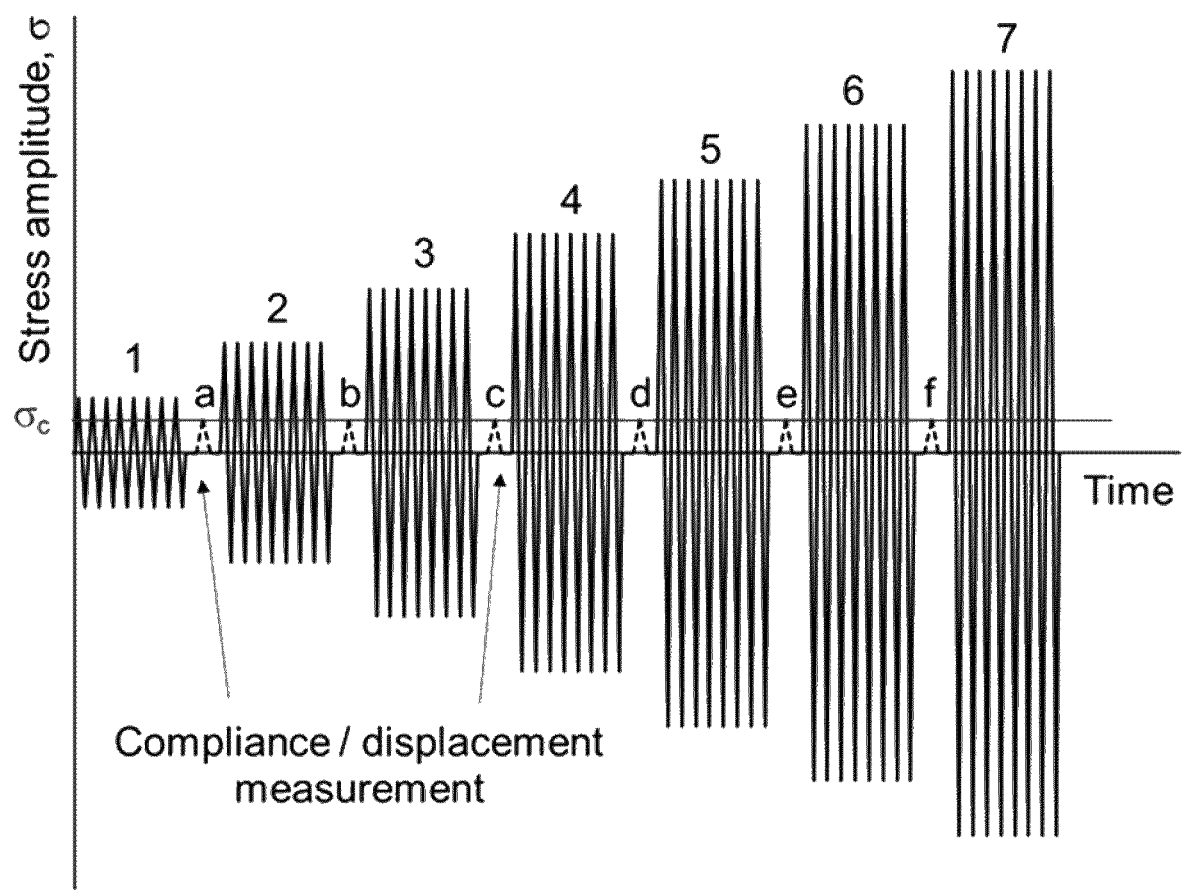
FIG. 1 shows a bidimensional chart with an axis representing time and the other axis representing the amplitude of each load applied to the specimen, including the cyclic loads performed during the test blocks, and the isolated specific loads ($\sigma_c$) applied during the deformation tests.

The cyclic loads of each test block are all of the same amplitude, but the amplitude of the cyclic loads of each test block are higher than the amplitude of the preceding cyclic blocks 1, 2, 3, 4, 5, 6 and 7, as shown on FIG. 1.

In this example, the increase of the amplitude between successive test blocks is linear, producing a regular increase between successive test blocks.

After each test block a deformation test a, b, c, d, e and f is performed by subjecting the specimen 10 to an isolated specific load of an amplitude equal or lower than the amplitude of each cyclic load of the initial test block, produced by a relative movement between the clamps 20. All the isolated specific loads of all the deformation tests are identical.

Each isolated specific load produces a deformation of the specimen, generally an elastic deformation, which is measured by the extensometer 30.

Because the cyclic loads of the successive test blocks 1, 2, 3, 4, 5, 6 and 7, of an increasing amplitude, produce fatigue damage on the specimen 10 and a stiffness reduction thereof, the specimen 10 suffers an increasing deformation on each successive deformation test a, b, c, d, e and f, which is measured by the extensometer.

Figure 2:
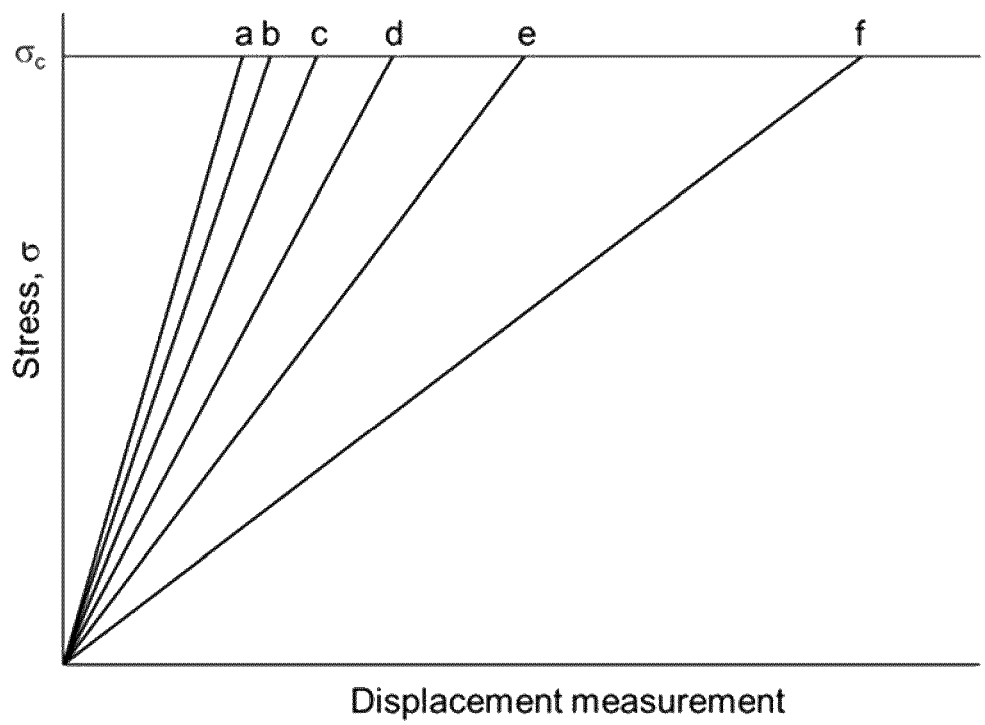
FIG. 2 shows a bidimensional chart with an axis representing the deformation suffered by the specimen on each deformation test, and the other axis representing the isolated specific load ($\sigma_c$) applied on each of said deformation test.

FIG. 2 shows said increasing deformation on each successive deformation test.

After a certain number of test blocks 1, 2, 3, 4, 5, 6 and 7, the fatigue damage produced on the specimen is considerable and the deformation suffered by the specimen 10 on each deformation test a, b, c, d, e and f increases in an accelerated manner.

Using the deformation measurements obtained by the extensometer 30 on each deformation test a, b, c, d, e and f, when related with the maximum amplitude of the cyclic loads of the test block 1, 2, 3, 4, 5, 6 and 7 performed before each deformation test a, b, c, d, e and f, allow the calculation of the undamaged fatigue limit of the specimen 10.

In this example, said calculation is performed by including the deformation measurements in a bidimensional chart where the ordinate axis represents the deformation suffered by the specimen 10 on each deformation test a, b, c, d, e and f and the abscissa axis represents the maximum amplitude of the cyclic loads of the test block performed previous to each deformation test a, b, c, d, e and f.

Figure 3:
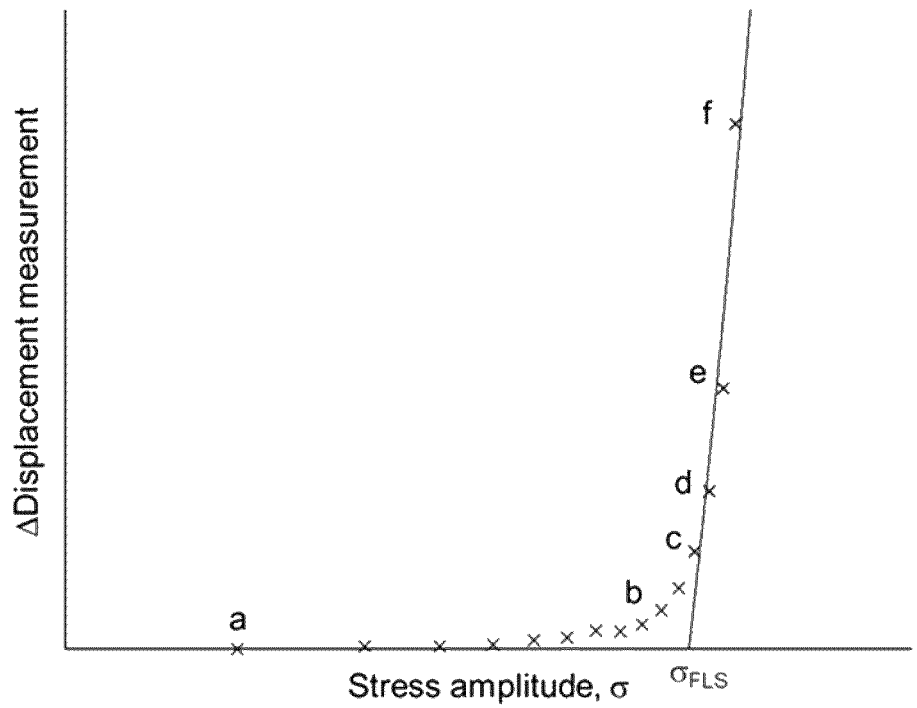
FIG. 3 shows a bidimensional chart with an axis representing the deformation suffered by the specimen on each deformation test and the other axis representing the maximum amplitude of the loads of the test block performed previous to each deformation test, and wherein the undamaged fatigue limit of the specimen is obtained, on said bidimensional chart, from the intersection between an asymptote line defined by the results of the successive deformation tests and an axis corresponding to zero deformation of the specimen.

Said deformation measurements included in said chart, shown on FIG. 3, determine a curve. Said curve define an asymptote which intersects with the abscissa axis. Said intersection point is the undamaged fatigue limit of the specimen 10.

The invention claimed is:

1. Fatigue limit testing method for specimens comprising:
    subjecting a specimen to be tested to successive test blocks, each test block comprising applying a vibration to the specimen, the vibration being defined by reciprocating successive cyclic loads without rest time in between according to load parameters, the load parameters of the cyclic loads of each test block having an amplitude higher than the load parameters of cyclic loads of the preceding test block;
    pause the cycling loads between successive test blocks;
    subjecting the specimen to a deformation test during the pause between successive test blocks, each deformation test comprising the application of an isolated specific load not contiguous to other loads to the specimen starting from and finishing in an unloaded state of the specimen, and performing deformation measurements from the specimen while being subjected to the specific load; and
    characterizing a fatigue behavior of the specimen considering at least a variation occurring on successive deformation measurements and considering the load parameters of cyclic loads preceding each deformation measurement.

2. The fatigue limit testing method according to claim 1; wherein during the application of the cyclic loads, the method comprises taking no deformation measurement of the specimen.

3. The fatigue limit testing method according to claim 1; wherein the method comprises applying the isolated specific load being:
    lower than a known yield strength of the specimen when the specimen has not suffered fatigue; or
    comprised between 15% and 60% of a known yield strength of the specimen when the specimen has not suffered fatigue damage.

4. The fatigue limit testing method according to claim 3; wherein the method comprises obtaining the known yield strength from tensile testing performed on an additional specimen which has not suffered fatigue damage, and which has identical shape, dimensions and material than the specimen subjected to cyclic loads during the test blocks.

5. The fatigue limit testing method according to claim 1; wherein the method comprises the application of load parameters of the cyclic loads comprised on each test block with the load parameters being:
    cyclic loads having a frequency comprised between 1 Hz and 80 Hz; and/or
    between 4000 and 8000 cycles; and/or
    cyclic loads all with the same frequency and amplitude; and/or
    cyclic loads all with the same frequency, the frequency being equal to the frequency of the cyclic loads contained in the other test blocks; and/or
    the same number of cycles than the other test blocks.

6. The fatigue limit testing method according to claim 1; wherein the method comprises increasing the amplitude of the load parameters of the cyclic loads between successive test blocks following a predefined increase pattern.

7. The fatigue limit testing method according to claim 6; wherein the method comprises increasing the amplitude following a linear increase pattern, a logarithmic increase pattern or a hybrid pattern combining an initial phase following a linear pattern and a final phase following a logarithmic pattern.

8. The fatigue limit testing method according to claim 1; wherein the method comprises alternating test blocks and the deformation tests until the breakage of the specimen occurs.

9. The fatigue limit testing method according to claim 1; wherein the method further comprises calculating an undamaged fatigue limit of the specimen considering the results of successive deformation tests each set in relation to the amplitude of the previous test block.

10. The fatigue limit testing method according to claim 9; wherein the method comprises:
    including the results of successive deformation tests in a bidimensional chart with an axis representing the deformation suffered by the specimen on each deformation test and the other axis representing the maximum amplitude of the loads of the test block performed previous to each deformation test, and
    obtaining the undamaged fatigue limit of the specimen from the intersection between an asymptote line defined by the results of the successive deformation tests and an axis corresponding to zero deformation of the specimen.

11. The fatigue limit testing method according to claim 1; wherein the method comprises applying the fatigue limit testing on a specimen being a flat rectangular specimen and elongated in a longitudinal axis direction and applying the cyclic loads thereon parallel to the longitudinal axis direction, SO that the obtained fatigue behavior corresponds with the fatigue behavior characterization of the material from which the specimen is made.

12. The fatigue limit testing method according to claim 1; wherein the method comprises applying the fatigue limit testing on a specimen being a non-rectangular and/or a non-flat test piece applying the cyclic loads from two separated subjection points of the test piece so that the obtained fatigue behavior corresponds to the fatigue behavior characterization of the non-rectangular and/or non-flat test piece.

13. The fatigue limit testing the method comprising method according to claim 1; wherein producing tensile stress on the specimen on each load of the cyclic loads and/or on every isolated specific load.

14. The fatigue limit testing method according to claim 1; wherein the method comprises actively or passively cooling the specimen to a room temperature between successive test blocks.

15. Fatigue limit testing method for specimens comprising:
    subjecting a specimen to be tested to successive test blocks, each test block comprising applying a vibration to the specimen, the vibration being defined by reciprocating successive cyclic loads without rest time in between according to load parameters, the load parameters of the cyclic loads of each test block having an amplitude higher than the load parameters of cyclic loads of the preceding test block;
    pause the cycling loads between successive test blocks;
    subjecting the specimen to a deformation test during the pause between successive test blocks, each deformation test comprising the application of an isolated specific load not contiguous to other loads to the specimen starting from and finishing in an unloaded state of the specimen, and performing deformation measurements from the specimen while being subjected to the specific load using an extensometer and/or an optic sensor facing a surface of the specimen comprising a stochastic pattern; and characterizing a fatigue behavior of the specimen at least a variation occurring considering on successive deformation measurements and considering the load parameters of cyclic loads preceding each deformation measurement.

* * * * *